United States Patent [19]
Frohock, Jr. et al.

[11] 3,720,131
[45] March 13, 1973

[54] BUILT-IN TEST FOR TANK FIRE CONTROL COMPUTER

[75] Inventors: Millard M. Frohock, Jr., Thousand Oaks, Michael A. Riley, William E. French, both of Los Angeles, all of Calif.

[73] Assignee: Hughes Aircraft Company, Culver City, Calif.

[22] Filed: Jan. 28, 1971

[21] Appl. No.: 110,572

[52] U.S. Cl. ............................89/41 ME, 324/158 R
[51] Int. Cl. ...............................................F41f 25/00
[58] Field of Search.......89/41 R, 41 M, 41 ME, 135; 73/167, 1 E; 235/61.5 E; 324/158 R, 158 SM, 158 SY

[56] References Cited

UNITED STATES PATENTS

| | | |
|---|---|---|
| 2,950,616 | 8/1960 | Blomqvist et al. .............324/158 SM |
| 3,192,475 | 6/1965 | Rice ................................324/158 SY |
| 2,696,605 | 12/1954 | Knickerbocker......................89/135 |
| 2,967,420 | 1/1961 | Carty et al................................73/167 |
| 3,237,100 | 2/1966 | Chalfin et al. ....................324/158 R |
| 3,604,897 | 9/1971 | McAdam et al. ................235/61.5 E |

OTHER PUBLICATIONS

M. Duband, "Voltage Checking Device," IBM Technical Disclosure Bulletin; Vol. 4, No. 8, Jan. 1962.

*Primary Examiner*—Stephen C. Bentley
*Attorney*—W. H. MacAllister, Jr. and D. C. Keaveney

[57] ABSTRACT

In combination with a Tank Fire Control Computer, comparators and logic for isolating faults in the system to a particular unit.

10 Claims, 4 Drawing Figures

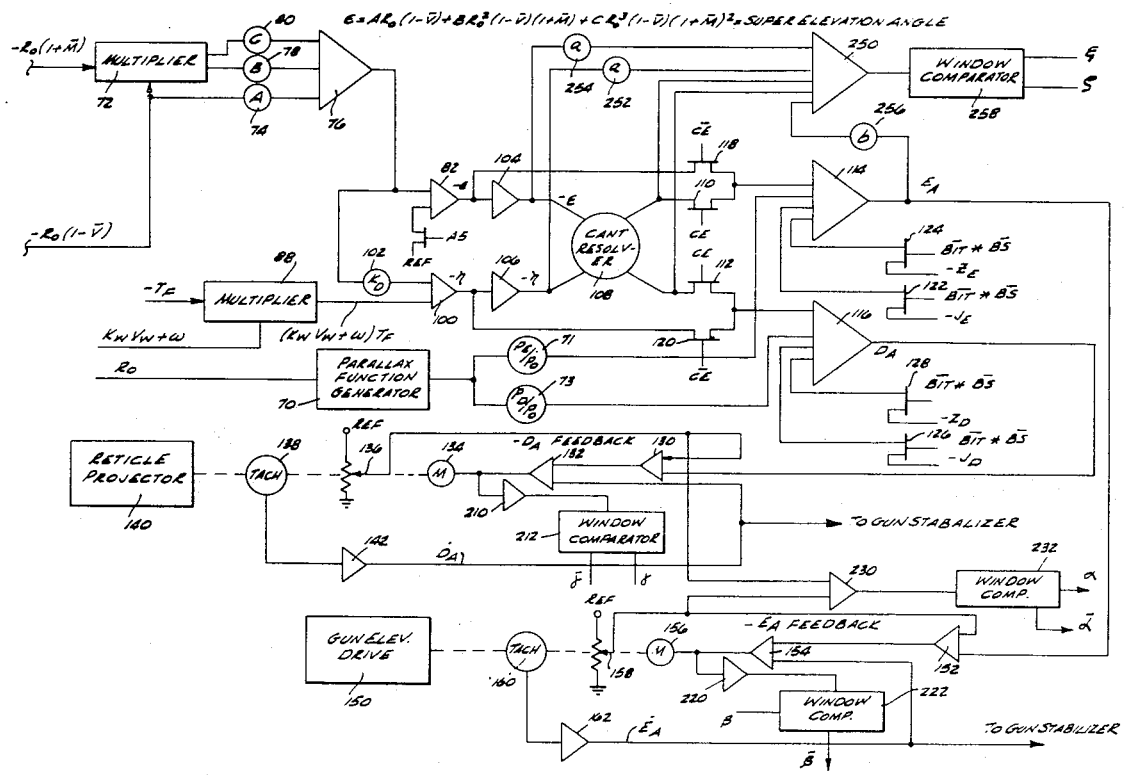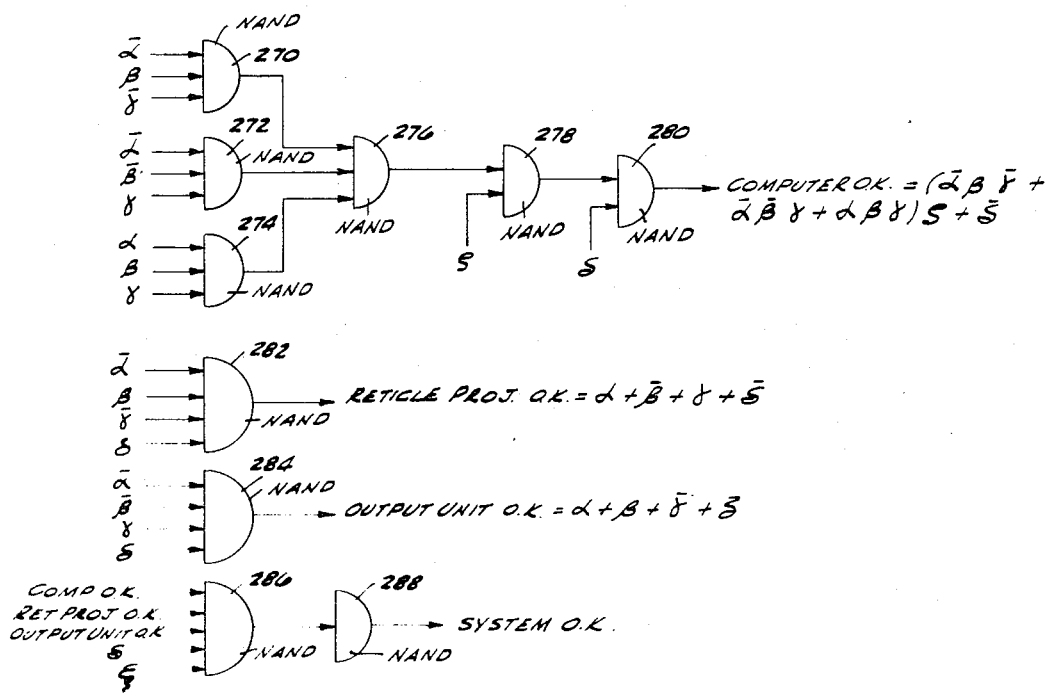

BUILT-IN TEST FOR TANK FIRE CONTROL COMPUTER

The invention herein described was made in the course of or under a Contract, or Subcontract thereunder, with the United States Army.

BACKGROUND OF THE INVENTION

1. Prior Art

The apparatus of this invention falls into the category wherein, during test, predetermined input signals are connected to certain input terminals while other input terminals are disconnected from the fire control system, the signals at predetermined points within the system are sampled to determine that their signals are within predetermined limits when said test signals are applied, and logical gates are connected to receive said test signals to produce signals indicative that the entire system or major subsystem components thereof are operating correctly.

2. Brief Description of the Invention

The apparatus of this invention is adapted to provide a built-in test apparatus and procedure for testing the fire control system and gun control apparatus within a tank. The fire control apparatus has, for example, means for sensing atmospheric pressure, ambient temperature, propellant grain temperature, and range to target, as well as means for determining the variations of fire control signals due to modifications in the barrel, and the like, due to prior firings of the guns. Typically, the apparatus has a tachometer, as well as an azimuth gyroscope, for generating signals indicative of the angular rate of the turret of the tank. A wind sensor for determining the cross wind velocity is also used to produce an input signal to the computer. The input signals are then combined to produce command signals for elevating and deflecting the tank guns, correcting for parallax and for cant of the tank about its roll axis.

Predetermined signals are placed into the inputs of the computer, said signals being chosen to produce predetermined signals at certain sampling points within the system, the sensed signals being compared to known values to produce logic signals indicative of the sensed signals being in or out of tolerance limits. Logical circuitry is then used to generate signals indicative of a "system go—no go" and signals indicative of the fact that particular electrical circuits are defective, whereby the individual circuits may be replaced in the field, a quick check made, and the apparatus again prepared to direct the gun.

It is therefore an object of this invention to test a tank fire control system.

It is another object of this invention to provide carefully selected inputs to a tank fire control system and to sample predetermined test points within said system, the values of signals at said test points being indicative of the proper performance of predetermined portions of said system.

It is a more particular object of this invention to apply predetermined input signals to a tank fire control system, to sense the signals produced at predetermined test points within said system, and to produce logical signals indicative of whether or not the signals at said test points are within tolerances, said logical signals being indicative of the defective portions of said system, if any.

It is still a more particular object of this invention to provide a process and apparatus for achieving the above-enumerated objects.

BRIEF DESCRIPTION OF THE DRAWINGS

Other objects will become apparent from the following description, taken in connection with the accompanying drawings, in which.

DETAILED DESCRIPTION OF THE INVENTION

Figure 1A:
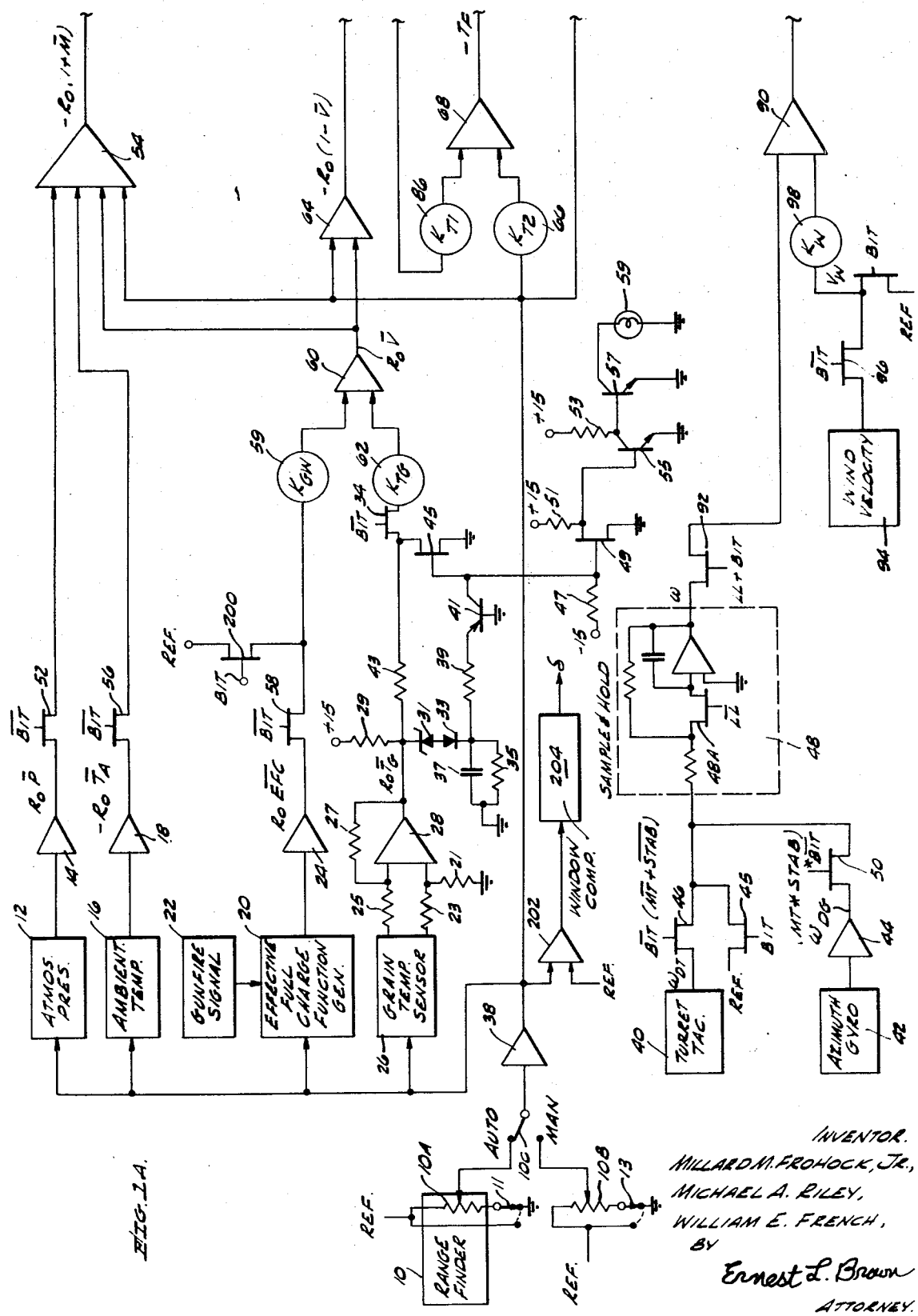
FIGS. 1a, 1b, 1c are a block diagram of a tank fire control computer adapted to be tested in accordance with the method and with the apparatus of this invention.
Figure 1B:
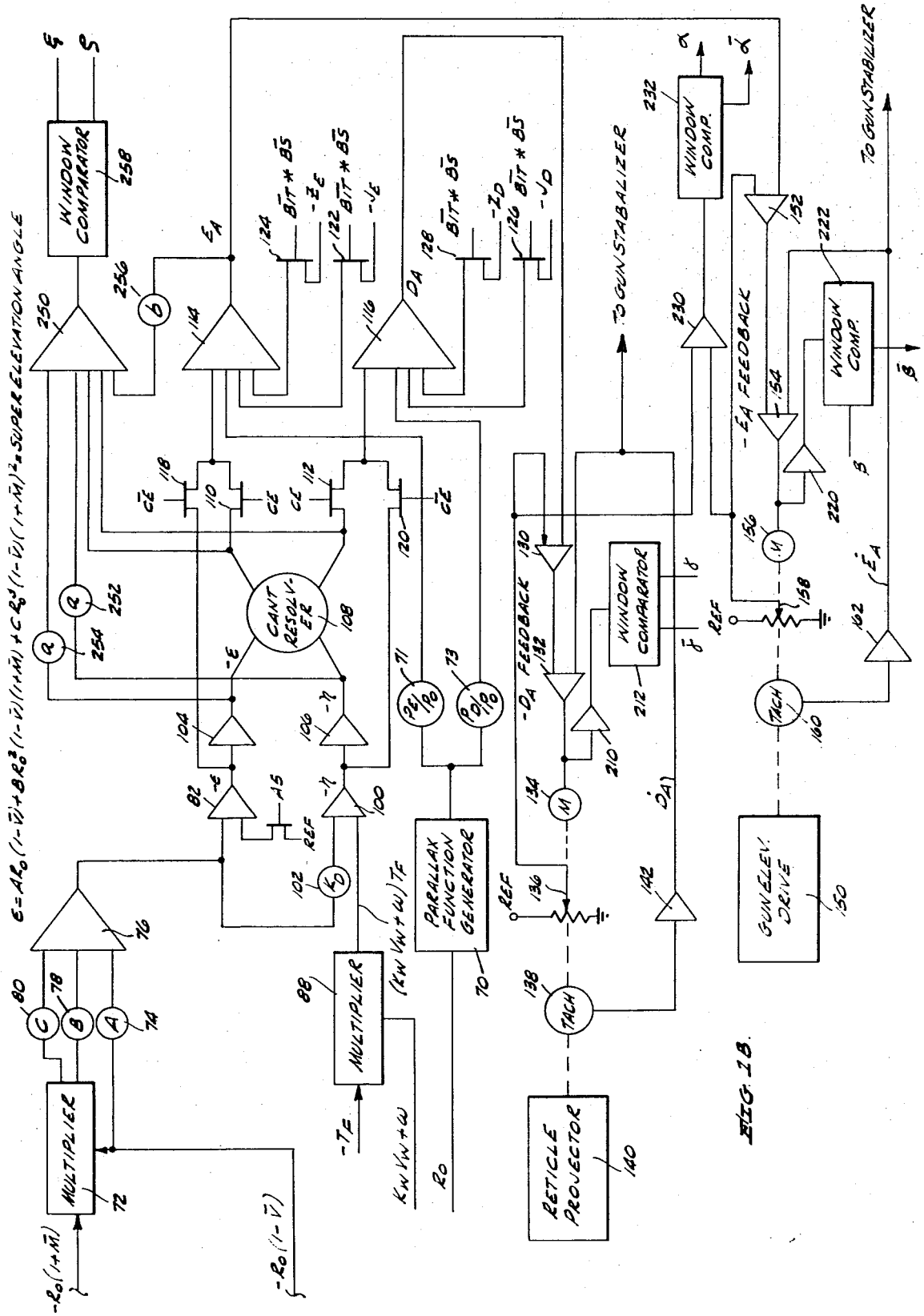
Figure 1C:
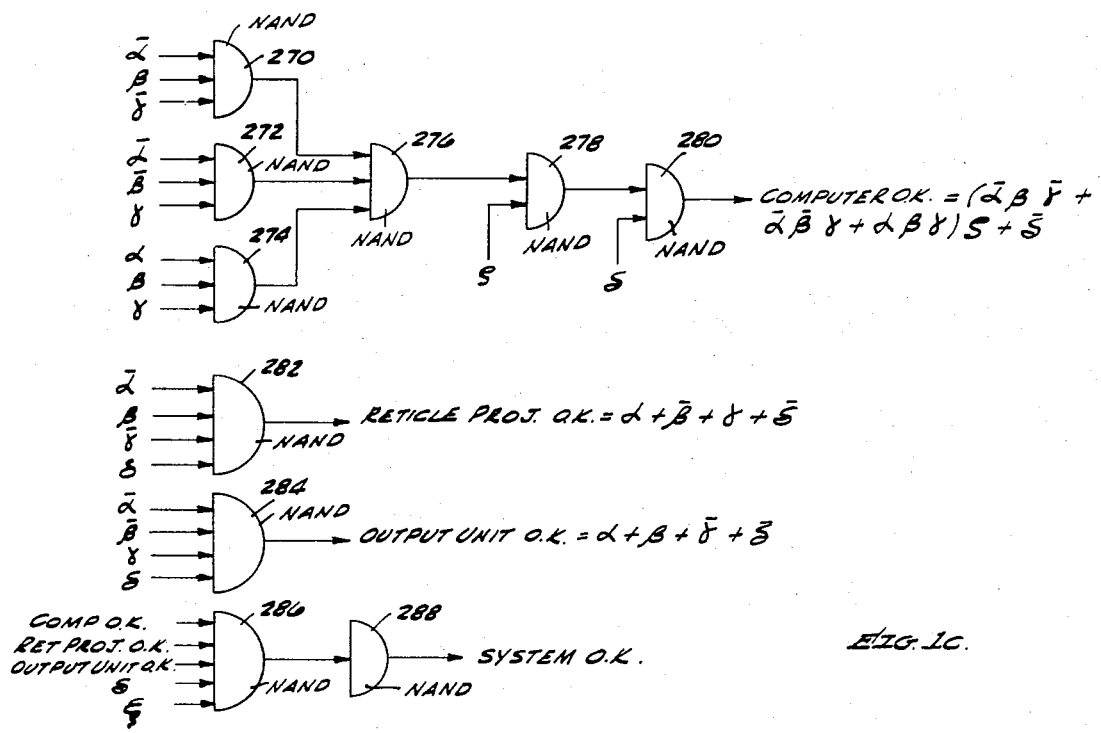

Description of the Fire Control Computer in Its Operative Mode

A rangefinder 10 which may be, for example, an optical rangefinder, a radar rangefinder, a laser rangefinder, or the like, is adapted to generate a signal (which may be an AC signal) which is a measure of the range from a tank (not shown) to a target (not shown).

Typically, the rangefinder 10 positions a potentiometer 10A whose position is indicative of range. The reference voltage of the potentiometer 10A is scaled to the computer to produce a voltage on the measure of the range from the tank (not shown) to the target (not shown). Alternatively, by switching switch 10C to its manual position, a manual range may be set in by the adjustment of potentiometer 10B.

An atmospheric pressure sensor such as, for example, a barometric pressure sensor connected into a bridge network, may be connected to receive excitation signals, from potentiometers 10A or 10B, proportional to the range from the tank to the target, to produce signals at the output of the atmospheric pressure sensor 12 proportional to the range multiplied by the ratio, $\bar{P}$, of the atmospheric pressure to a predetermined reference pressure. An amplifier 14 isolates the pressure sensor 12 from the rest of the circuit. Instead of a sensor, element 12 may be merely a means for setting in a measure of atmospheric pressure.

An ambient temperature sensor 16, which may be, for example, a variable resistor in a bridge which is excited by signals from the rangefinder 10 to produce signals proportional to the range between the tank and the target times the ratio of the ambient temperature to a predetermined temperature. The amplifier 18 is used to reverse the sense of the signals and to isolate the ambient temperature sensor from the rest of the circuit. The element 16, instead of a sensor, may be merely a means for setting a measure of temperature voltage into the system.

An effective full-charge function generator 20 is adapted to generate a signal which is a function of the ammunition used and of the wear of the gun. The function generator 20 receives a gun fire signal 22 each time the gun is fired to produce a correction signal which corrects for the wear of the gun. That correction signal is shown at the output of amplifier 24 as the product of the range signal, $R_o$, multiplied by a weighting function "$\overline{EFC}$" which is indicative of the wear of the gun.

A grain temperature sensor 26, positioned within the storage bin for the projectiles, is excited by the signal from rangefinder 10 to produce a signal at the output of amplifier 28 which is a measure of the range, $R_o$, from the tank to the target multiplied by the ratio $\overline{T}_G$, of the grain temperature to a predetermined temperature. If the grain temperature sensor 26 fails, a rare occurrence, the amplifier 28 indicates a substantial change in grain temperature, erroneously affecting the operation of the computer. The output of the amplifier 28, with its feedback resistor 27 and scaling resistors 21, 23, 25, is a measure of $R_o \overline{T}_G$. The output of amplifier 28 is connected to the junction between resistor 29 and zener diode 31 and to the current limiting resistor 43.

The resistor 29, zener diode 31, diodes 33, and R-C filter 35–37 form a series - connected combination from a voltage source to ground, designed to sense the voltage output of the amplifier 28. When the voltage of amplifier 28 exceeds a predetermined value, the Zener diode breaks down, producing a voltage across resistor 39, driving transistor 41 to switch the FET's 45 and 49 into their conductive state. Conduction of FET 45 clamps the right-hand side of the resistor 43 to ground potential, thereby eliminating the effect of the $R_o T_G$ signal on the computer. The conduction of FET 49 causes transistor 57 to conduct, lighting lamp 59, indicating that the $T_G$ temperature sensor has failed.

It is important at this point in the explanation to state that the built-in test mode of operation is controlled by a signal "BIT." There are available both BIT and $\overline{\text{BIT}}$ signals, the latter indicating that the computer is in an operating rather than a test mode of operation, thus, for example, for the FET gate 34 to conduct, allowing a signal to be passed therethrough, a $\overline{\text{BIT}}$ signal must be present.

The amplifier 38 acts as a buffer and power amplifier to produce a properly scaled $R_o$, the range from the tank (not shown) to the target (not shown) signal.

Typically the turret of the tank (not shown) has a tachometer 40 which is adapted to generate a signal which is a measure of the angular velocity of the turret (not shown) relative to the tank (not shown). An azimuth gyroscope 42 within the tank, through an amplifier 44, produces a signal which is a measure of the rotation of the turret about an azimuth axis. The azimuth gyroscope 42, typically, is part of the stabilizing system of the tank, which operates when the tank is moving. A logic signal "STAB" is produced when the stabilizing system, including the azimuth gyro 42, is operating. When the tank is moving, a logic signal "MT" appears.

When the computer is not in its built-in-test mode of operation and when the tank is not moving and the stabilizing system is not operating, the FET gate 46 is conducting, delivering a signal from the turret tachometer 40 to the input of the sample and hold circuit 48.

When the tank is moving and the stabilizing system is on, and the system is not in its built-in-test mode of operation, the gate 46 is nonconducting, and the FET gate 50 delivers a signal from amplifier 44 to the input of the FET sample and hold circuit 48. To understand the logic symbols of gates 46 and 50, it must be understood that the stabilizing system may be on without the tank moving, but if the tank is moving the stabilizing system is usually on. Further, when the system is being tested, the tank is not moving.

When the apparatus is not in its built-in-test mode, the FET gates 52 and 56 are conducting, connecting the outputs of amplifiers 14 and 16 to the input of amplifier 54.

When the apparatus is not in its built-in-test mode of operation, FET gate 58 is conducting, connecting the output of amplifier 24, through scaling resistors 59, which determine constant $K_{GW}$, to the input of amplifier 60.

When the apparatus is not in its built-in-test mode of operation, and $\overline{T}_G$ is not excessive, the output of amplifier 28 is connected through gate 34 and scaling resistors 62, which multiplies it by a factor $K_{TG}$, to the input of amplifier 60.

The output of amplifier 60 is connected to the input of amplifier 54 and to the input of amplifier 64.

The output of amplifier 38 is connected to the input of amplifier 54, to the input of amplifier 64, through scaling resistor 66, which scales in accordance with a factor $K_{T2}$, to the input of amplifier 68, to the input of a parallax function generator 70, and to the inputs of elements 12, 16, 20 and 26.

The output of amplifier 54, designated "$-R_o(1+\overline{M})$" is connected to the input of multiplier 72. The designation "$\overline{M}$" takes into account the effects of $\overline{P}$, $\overline{T}_A$, $\overline{\text{EFC}}$ and $\overline{T}_G$.

The output of amplifier 64, designated "$-R_o(1-\overline{V})$" is connected to the input of multiplier 72 and, through resistor 74, scaled downward by a factor "A," to the input of amplifier 76. The designation "$\overline{V}$" takes into account the effects of $\overline{\text{EFC}}$ and $\overline{T}_G$.

Two outputs of multipliers 72 are connected through scaling resistors 78 and 80 to the input of amplifier 76. The output of amplifier 76, designated $\epsilon$, is called the "superelevation angle" and has been determined, by ballistics, to be a function of the outputs of amplifiers 54 and 64 in accordance with the formula, $$\epsilon = AR_o(1-\overline{V}) + BR_o^2(1-\overline{V})(1+\overline{M}) + CR_o^3(1-\overline{V})(1+\overline{M})^2$$

The super-elevation angle is the angle between the gun line and the optical line of sight to the target. The output of amplifier 76 is connected to the input of amplifier 82. The output of amplifier 82 is modified in accordance with a reference voltage by the closing of FET gate 84 when a particular ammunition, designated "A5," is used. Otherwise, the output of amplifier 82 is merely the negative of the output of amplifier 76.

The output of amplifier 76 is connected, through scaling resistors 86 having a scale factor "$D_{T1}$" to the input of amplifier 68 which produces a signal which is a function of both range and super-elevation of the gun and has been properly scaled to be proportional to the time of flight of the projectile, $T_F$. The output of amplifier 68 is connected to the input of multiplier 88.

The computer moves the sighting reticle and ballistic drive during operation. The human operator tries to cause the gun to follow the lead of the computer, which produces oscillation and overshoot of the gun. To prevent overshoot, the operator, at the last second before firing, presses a button called "lead lock" which produces a signal "LL" which closes the FET gate 48A, causing the sample and hold circuit 48 to be placed in its "hold" mode of operation. Thus, the computer does not drive the reticle to lead the target until immediately prior to firing, at which time the operator "pickles" the lead by pressing an "LL" leadlock switch and the lead is inserted. It should be noted that the compensation for the rotation of the tank and/or the turret is delivered to amplifier 90 only when the leadlock signal is applied to the FET gate 92.

The wind velocity sensor 94 produces a signal when the computer is not in its test mode, which is delivered through the FET gate 96 and the scaling resistors 98 to the input of amplifier 90. The resistors 98 scale the effect of the wind velocity signal by a factor "$K_W$". The output of amplifier 90 is connected to the input of multiplier 88. The output of multiplier 88 is a signal which is a measure of the time of flight of the projectile multiplied by the sum of the wind and turret rotation factors.

The output of multiplier 88 is connected to the input of amplifier 100. The output of amplifier 76 is connected, through scaling resistors 102 to the input of amplifier 100. The resistors 102 scale the super-elevation angle signal from amplifier 76 by a factor "$K_D$". The output signal of amplifier 100 is a signal proportional to $-\eta$, the azimuthal deflection of the projected reticle (not shown).

The outputs of amplifiers 82 and 100 are connected, through driving amplifiers 104 and 106, to the stator windings of a cant resolver 108 which corrects for the cant or roll angle of the tank.

The cant resolver is used when the tank is stationary. When the tank is stationary and the equipment is not under test, a signal "CE" is delivered to FET gates 110 and 112, causing a signal ($\epsilon \cos \theta - \eta \sin \theta$) to be delivered to the amplifier 114 and a signal ($\eta \cos \theta + \epsilon \sin \theta$) to be delivered to the amplifier 116 from the cant resolver 109. $\theta$ is the angle of cant of the tank. When the tank is moving or the equipment is in the built-in-test mode of operation, a signal "$\overline{CE}$" causes gates 118 and 120 to conduct, allowing the $-\epsilon$ and $-\eta$ signals to be delivered directly to the amplifiers 114 and 116, respectively.

Provided the computer is not in a test mode and is not in a boresight mode of operation, designated "BS," a predetermined jump signal "$J_E$" and a zeroing signal, "$Z_E$" (which must b adjusted) are also applied to the input of amplifier 114 to produce a signal "$E_A$" which is a gun elevation command signal.

Similarly, when the computer is not in its built-in-test mode and is not in its boresight mode, a jump signal "$J_D$" and a zeroing signal "$Z_D$" (which must be adjusted) are applied to the input of amplifier 116 to produce a reticle deflection command signal "$D_A$."

The $J_E$, $J_D$, $Z_E$, and $Z_D$ signals are gated into the inputs of amplifiers 114 and 116, respectively, by the FET gates 122, 124, 126 and 128.

The parallax function generator 70 corrects for parallax of the gunsight. A typical output signal is proportioned to $1/R_o - 1/1200$. The output of generator 70 is delivered, after modification by scaling resistor 71, to amplifier 114. The output of generator 70, after modification by scaling resistor 73, is delivered to amplifier 116. The resistors 71 and 73 compensate for differences in parallax errors about the elevation and deflection axes.

The output of amplifier 116 is applied to the input of a damped servo to drive the reticle projector 140. More particularly, the output of amplifier 116 is connected to the input of amplifier 130. The output of amplifier 130 is connected to the input of power amplifier 132 which, in turn, drives a motor 134. The motor 134 drives the arm of a potentiometer 136 and drives a tachometer 138 as well as the reticle projector 140. The tachometer 138 produces a signal which is a measure of the angular rate of motor 134. The output of tachometer 138 is connected, through amplifier 142, to an input of amplifier 132 and to the gun stabilizer (not shown). The signal on the movable arm of potentiometer 136 is proportional to $D_A$, but with a negative sense, when the reticle projector 140 follows the signal $D_A$. The arm of potentiometer 136 is electrically connected to an input of amplifier 130.

The output of amplifier 114 is connected to a servo amplifier to drive the gun elevation drive mechanism 150 relative to the line of sight of the reticle. More particularly, the output of amplifier 114 is connected to the input of amplifier 152. The output of amplifier 152 is connected to an input of power amplifier 154 which drives motor 156. Motor 156 drives potentiometer 158, tachometer 160, and the gun elevation drive 150. The output of the tachometer 160 is a measure of the angular rate of motor 156. The output of tachometer 160 is connected through amplifier 162 to an input of amplifier 154 and to the gun stabilizer (not shown). The voltage appearing on the movable arm of potentiometer 158 is proportional to $E_A$, but of opposite sense, when the gun elevation drive accurately follows the signal $E_A$. The arm of potentiometer 158 is electrically connected to an input of amplifier 152.

In operation, the operator of the tank causes the gun to follow the reticle. The reticle is positioned at a fixed elevation, but is moved in azimuth by the reticle servo motor 134. The operator causes the gun and tank turret (not shown) to follow the reticle. The gun is servoed, in elevation, above the line of sight of the reticle by the motor 156 and super-elevation drive.

The Testing Method and Apparatus

When it is desired to operate the equipment in its built-in-test mode, the tank is not moving and a signal BIT is produced, thereby extinguishing the signal $\overline{BIT}$. As noted above, the CE signal is also extinguished and a $\overline{CE}$ signal appears causing the cant resolver 108 to be bypassed.

The test apparatus of this invention, in a preferred embodiment, uses window comparators as analog-to-digital converting devices. When a voltage being tested is within a predetermined range, the boundary of which may positive or negative, a first binary state is produced at the output of the window comparator. When the voltage being tested is outside of that predetermined range, the window comparator produces a voltage having a second binary state.

Figure 2:
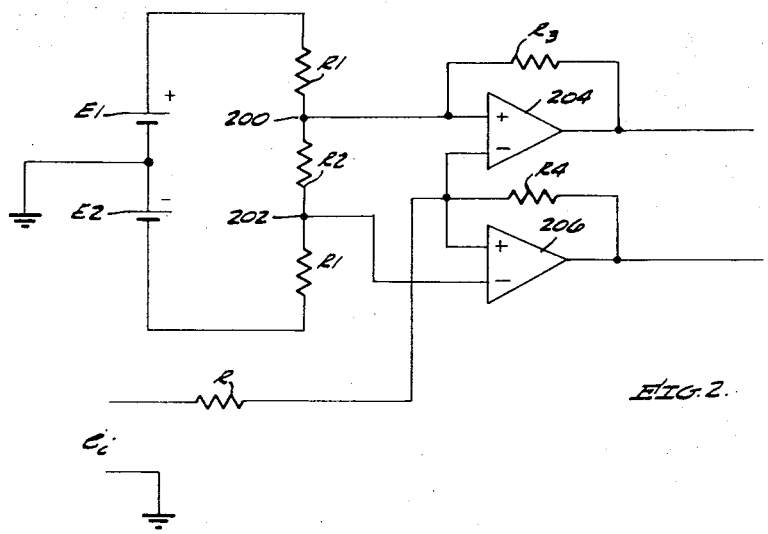
FIG. 2 is a circuit diagram of a typical window comparator which may be used in the invention.

A typical window comparator is shown in FIG. 2. A voltage divider having resistors R1, R2, R1 is connected across a DC source, shown in two parts E1, E2. The junctions 200 and 202 are maintained at predetermined voltages depending upon the window voltages of the apparatus. The input voltage is applied through resistor R to the $-$ input terminal of comparator 204 and the $+$ input terminal of comparator 206. Resistors R3 and R4 provide feedback paths for the comparators 204 and 206, respectively. The values of the resistors and reference voltages determine the boundaries of the windows. When the input voltage exceeds a first predetermined voltage, a voltage corresponding to binary zero appears at a first output terminal. When the input voltage is less than a second predetermined voltage, a voltage corresponding to a binary zero appears at a second output terminal. The window is between the two predetermined voltages. When the input voltage is within the window, both terminals support voltages corresponding to a binary one.

When the computer is placed in its built-in-test "BIT" mode of operation, the outputs of amplifiers 14 and 18 are disconnected from the input of amplifier 54; the output of amplifier 28 is disconnected from the input of amplifier 60; the amplifier 24 is disconnected from the input of amplifier 60; and a reference voltage is channeled through the FET gate 200 and scaling resistor 59 to the input of amplifier 60.

When the computer is placed in its built-in-test (BIT) mode of operation, a reference voltage of a predetermined amplitude representative of a typical range between a tank (not shown) and a target (not shown) is applied by switch 11 to both ends of potentiometer 10A. Note that the reference voltage applied to potentiometer 10A during test is different than the voltage applied during operation. With the predetermined reference voltage applied through the switch 10C to the input of amplifier 38, the output of amplifier 38 is then compared by amplifier 202 to another reference voltage, and the difference between the two produces a signal at the output of the window comparator 204. When potentiometer 10A and the amplifier 38 are properly operating, the binary signal produced at the output of window comparator 204 is δ. When, however, either potentiometer 10A or amplifier 38 is not properly operating, the difference between the signal at the output of amplifier 38 and the reference signal at the input of amplifier 202 is significant, the window comparator 204 extinguishes the δ signal. The δ signal may be used to light a light (not shown). If a δ signal is not produced, the switch 10C is then changed to its "Manual" position with switch 13 in position to receive its reference voltage at each end of potentiometer 10B. If a δ signal immediately re-appears, potentiometer 10A is defective and should be replaced. If a δ signal does not immediately appear when switch 10C is switched, amplifier 38 is defective and, since amplifier 38 is part of the computer, the computer should be replaced.

When the reticle projector 140 is accurately following the $D_A$ signal, the voltage at the output of amplifier 132 is very small. The voltage at the output of amplifier 132 is sampled by an amplifier 210 and is applied to a window comparator 212 to generate a signal γ when the voltage of output of amplifier 132 is within predetermined limits of zero, and a second signal $\bar{\gamma}$ when the voltage at the output of amplifier 132 is out of limits.

When the gun elevation drive 150 is properly following the signal $E_A$, the voltage at the output of amplifier 154 is very small. The voltage at the output of amplifier 154 is sampled by amplifier 220. The output of amplifier 220 is applied to the input of window comparator 222 to produce a signal β when the voltage at the output of amplifier 154 is within a predetermined limit of zero and a voltage $\bar{\beta}$ when the voltage of the output 154 is out of tolerance.

An amplifier 230 is connected to sample and compare the position feedback voltages of the servo systems driving the reticle projector 140 and driving the gun elevation drive 150. The output of amplifier 230 is connected to a window comparator 232 which is adapted to produce an α signal when the difference between the position feedback signals are within predetermined tolerances and to produce a signal $\bar{\alpha}$ when the difference between the two position feedback signals are out of tolerance. The voltage applied to FET gate 45 is initially determined to cause α to have a binary one voltage when the system is operating properly.

Amplifier 250 has five inputs. The stator windings of the cant resolvers are connected, through scaling resistors 254 and 252, to two of the inputs of amplifier 250. The rotor windings of cant resolver 108 are connected directly to two inputs of amplifier 250. The output of amplifier 114 is connected, through scaling resistor 256, to the fifth input of amplifier 250. To determine the values of the resistors 252, 254 and 256, it is first assumed that the entire computer is operating in its test mode, and individual defects, such as the opening of one or the other of the stator or rotor windings or the opening of the compensating windings occurs. When the various windings are individually opened, the voltages at the output of amplifier 250 vary not only with the resultant perturbed voltages, but also as functions of $a$ and $b$, the scale factors of the resistors 252, 254, and 256. For the output of the amplifier 250 to be zero, it turns out that $b$, the scale factor or resistor 256 has to be equal in amplitude to "$|2a - 2|$," where $a$ is the scale factor of resistors 252 and 254. The window comparator 258 is connected to receive signals from amplifier 250. With one or the other of the driving amplifiers 104 or 106 inoperative, the output of amplifier 250 takes on certain values. With driving amplifiers 104 and 106 properly operating, but with one of the windings of cant resolver 108 open, the output of amplifier 250 takes on different values. With the amplifiers 104, 106, and with resolver 108 operating properly, the output voltage of amplifier 250 is within the window of window comparator 258. The window comparator 258 is adapted to generate a digital signal ε when the cant resolver 108 is properly operating and to generate a signal ζ when the driver amplifiers 104 and 106 are properly operating. In a typical operation, for example, with the cant resolver having a defect, the output voltage of amplifier 250 would be between −0.35 and −3.85 volts. With one or the other amplifiers 104 or 106 inoperative, the output of amplifier 250 would be between 0 and +3.57 volts. With both the cant resolver properly operating and the amplifiers 104 and 106 properly operating, the output of amplifier 250 would be between 0 and −0.35 volts. Thus, the ε signal would be extinguished by the window comparator 258 when the output of amplifier 250 is between −0.35 and −3.85 volts. Similarly, the ζ signal at the output of window comparator 258 would be extinguished when the output of amplifier 250 is between 0 and −3.57 volts. It should be noted that the numerical values are merely illustrative and, in general, would change with the type of ammunition as well as the type of amplifiers and type of resolver. In any given apparatus of the type described, it would be necessary before calibrating the window comparator 258 and the potentiometers 252, 254, 256 to investigate the range of values of the output of amplifier 250 for various possible defects in the cant unit.

Light signals (not shown), or other alarm, may be connected to light when an $\alpha$, $\beta$, $\gamma$ or $\delta$ signal appears or disappears at the option of the designer.

A series of NAND gates complete the detection apparatus of this invention. The $\overline{\alpha}$, $\beta$, and $\overline{\gamma}$ signals are connected to the input of gate 270. The $\overline{\alpha}$, $\overline{\beta}$, and $\gamma$ signals are connected to the input of gate 272. The $\alpha$, $\beta$, and $\gamma$ signals are connected to the input of gate 274. The outputs of gates 270, 272, 274 are connected to the input of gate 276. The output of gate 276 and the $\zeta$ signals are connected to the inputs of gate 278. The output of gate 278 and the $\delta$ signal are connected to the inputs of gate 280. The $\overline{\alpha}$, $\beta$, $\overline{\gamma}$, and $\delta$ signals are connected to the inputs of gate 282. The $\overline{\alpha}$, $\overline{\beta}$, $\gamma$, $\delta$ signals are connected to the inputs of gate 284. The output of gate 280, the output of gate 282, the output of gate 284, the $\delta$ signal, and the $\epsilon$ signal are connected to the inputs of gate 286. The output of gate 286 is connected to the input of gate 288.

To test the apparatus in accordance with this invention, the tank is stopped and signals BIT and $\overline{CE}$ are applied, where shown. The signals $\overline{BIT}$ and CE disappears. The switches 11 and 13 are turned on to be connected with the reference voltage. If the output voltage of amplifier 38 is not substantially equal to the reference voltage applied to the input of amplifier 202, the window comparator produces a signal $\overline{\delta}$ and rings an alarm or lights a light (not shown).

Assuming there is no alarm produced by the signal $\delta$, the operator then knows that the amplifier 38 and potentiometer 10A are operating properly. If an alarm is produced, switch 10C is switched to check potentiometer 10A.

The reference voltage applied to the FET gate 45 produces a signal which is adapted to cause the feedback delivered to amplifier 130 to be equal to the feedback delivered to the amplifier 252 when, indeed, the voltages at the outputs of amplifiers 132 and 154 are substantially zero. That reference voltage may, then, be set in the laboratory at a time when both $\beta$ and $\gamma$ are equal to the binary one voltage, indicating that the voltages at the outputs of amplifiers 132 and 154 are each substantially zero. With either one or the other of the amplifiers or the servos in the $D_A$ or $E_A$ loop inoperative, the feedback signals to amplifiers 130 and 152 will not be equal and the window comparator 232 will generate a signal binary $\overline{\alpha}$ voltage.

During the time that potentiometer 10A or amplifier 38 is defective, the signal $\delta$ is extinguished, which produces an output signal from gate 280. The signal from gate 280 does not necessarily indicate that the computer is operating properly, but rather than one should look elsewhere for the trouble. In this instance, the absence of the signal $\delta$ will show that the defect is in potentiometer 10A or amplifier 38. After potentiometer 10A or amplifier 38 is replaced, the signal $\delta$ reappears, indicating that a proper signal $R_o$ is being produced.

Assuming that the output of amplifier 38 is satisfactory, whereby the $\delta$ signal at the output of the window comparator 204 is a binary one voltage, if the window comparator 258 generates an output signal $\zeta$, the driver amplifiers, 104 and 106, are operating properly. If the amplifiers 104 and 106 are not operating properly, the signal $\zeta$ registers a binary zero voltage and no signal appears at the output of amplifier 280, whereby an indication occurs that the computer is not operating properly. An alarm (not shown) may be actuated by the extinguishing of the output of gate 280.

Assuming that the amplifiers 104 and 106 are operating properly, whereby a signal $\zeta$ appears at the output of window comparator 258, consider the signals, $\alpha$, $\beta$, and $\gamma$. Recalling that, with the computer operating properly, the reference voltage applied to the input of FET gate 45 is adjusted to cause the feedback voltages delivered to amplifiers 130 and 152 to be equal, with the two feedback voltages equal and with the voltages at the outputs of amplifiers 132 and 154 substantially zero, the computer is operating properly, and a signal appears at the output of gate 280.

When the feedback voltages applied to amplifier 130 and 152 are unbalanced, the window comparator 232 produces a signal $\overline{\alpha}$. With a signal $\overline{\alpha}$, if the voltages at the outputs of amplifiers 132 and 154 are both substantially zero, it is indicated that the servos driving the tachometers 138 and 160 and the potentiometers 136 and 158 as well as the reticle projector 140 and the gun elevation drive 150 are operating properly and that the computer is defective, whereupon the computer unit may be removed from the tank and replaced with an operating unit.

When a signal $\overline{\alpha}$ appears at the output of window comparator 232, if the voltage at the output of amplifier 132 is not substantially zero, a signal $\overline{\gamma}$ appears, indicating that the motor 134, the potentiometer 136, or the tachometer 138 is defective. Similarly, the appearance of a signal $\overline{\beta}$ at comparator 222 indicates that the motor 156, the potentiometer 158, or the tachometer 160 is defective. With portions of the servo system defective, assuming only one defect at a time, the computer is assumed to be satisfactory and a signal appears at the output of gate 280.

When, during test, the window comparator 204 produces a signal $\delta$, the window comparator 232 produces a signal $\overline{\alpha}$, the window comparator 212 produces a signal $\overline{\gamma}$, and window comparator 222 produces a signal $\beta$, it is an indication that the motor 134, the potentiometer 136, or the tachometer 138 is operating improperly, that is the reticle projector drive mechanism is defective. A signal at the output of NAND gate 282 indicates that the reticle projector drive mechanism is operating satisfactorily. Presence or absence of a signal at the output of gate 282 may be used to actuate a light or alarm (not shown).

Similarly, a signal $\delta$ at the output of window comparator 204, a signal $\overline{\alpha}$ at the output of the window comparator 232, a signal $\overline{\beta}$ at the output of window comparator 222, and a signal $\gamma$ at the output of window comparator 212 indicates that the motor 156, the potentiometer 158, or the tachometer 160 is defective or operating improperly. The output at the NAND gate 284 indicates that the output unit driving the gun elevation drive 150 is operating satisfactorily. Presence or absence of a signal from gate 284 may produce a light or alarm (not shown).

The NAND gate 286, in series with the NAND gate 288 is adapted to receive simultaneous signals from gates 280, 282, 284, and from window comparators 204 and the $\epsilon$ output of window comparator 258, indicating that the entire fire control mechanism under test is operating satisfactorily. The output of gate 288 may be used to light or extinguish a light or alarm (not shown).

In summary, the method and apparatus of this invention is particularly adapted to operate as a built-in test for a tank fire control system having at least range-to-target, windage, and turret angular rate inputs, and having a pair of output servos which may either direct the gun or the gun-sight (or both, or either) about two axes. The computer bridges between the inputs and the servo commands to solve the ballistics problems.

A test signal is applied to the range potentiometer. The signal at the output of the range buffer amplifier is compared to the test signal and, if within limits, a binary signal is generated signifying that the range potentiometer and buffer amplifier are not defective.

A test signal is applied to the turret angular rate input, of magnitude to cause the elevation and deflection (or azimuth) command signals substantially equal. The equality is sensed by comparing the voltages on the feedback loops of the servos, and a binary signal is generated signifying that the command signals are, within limits, equal.

When each servo is closely tracking its command signal, its error signal, measured in the forward loop of the servo is substantially zero. The error signal in the forward loop of each of the servos is sensed, and if within predetermined limits of zero a binary signal is generated signifying that the particular signal is tracking.

The cant resolver is separately checked by applying signals through the driving amplifiers to the cant resolver. The properly weighted voltages at the input terminal of one driver amplifiers, the output terminals of both amplifiers, and the output terminals of the resolver are summed, producing two binary signals, when the weighted sum is within a window, signifying that both the driver amplifiers and the resolver are not defective.

The various binary signals are then combined in various combinations, signifying to the operator that each subsystem and the entire system are without defects.

Although the invention has been described in detail above, the invention is not to be limited thereby, but only in combination with the appended claims.

What is claimed is:

1. A method for testing a winding compensated resolver and its driving amplifiers comprising:
   a. sensing the voltage applied to at least one of said driving amplifiers;
   b. sensing the voltages on the windings of said resolver;
   c. summing said voltages with scaling adjusted to produce a window of said summed voltages within which said resolver and said amplifiers are not defective and outside of which said resolver or said amplifiers are defective, at least one of said amplifiers being defective when said summed voltages are outside of said window on one side thereof and at least one winding of said resolver being defective when said summed voltages are outside of said window on the other side thereof; the scaling of said voltage applied to said amplifiers, designated $b$, being related to the scaling of said voltage at the output of said amplifiers, designated $a$, as $|b| = |2a - 2|$.

2. Apparatus for testing a tank fire control system wherein said fire control system contains at least means for receiving signals which are a measure of range between a tank and target, a measure of wind velocity, and a measure of angular rate of tank turret rotation; means responsive at least to said range, wind velocity, and angular rate signals for producing signals which are a measure of displacement of a sighting reticle about an azimuth axis, and a measure of the super-elevation angle of the tank's gun; and servo means for servoing said gun in elevation and for servoing said sighting reticle in azimuth, said means for testing comprising:
   a. means for applying predetermined range, wind velocity, and angular rate signals to said means for receiving, at least one of said predetermined signals being adjusted to cause the command signals to said servos to be substantially equal;
   b. means for sensing pre-chosen responses of said system to said signals;
   c. means for producing binary signals indicative of whether said responses are within predetermined ranges, said means including means for sensing and indicating by a binary signal, $\delta$, when said range signal is correctly transmitted to the remainder of the system; means for sensing and indicating by a binary signal, $\alpha$, a balance in the feedback loops of said servos; and means for sensing and indicating by binary signals, $\overline{\beta}$ and $\overline{\gamma}$, excessive signals in each of the forward paths of said servos, respectively; and
   d. logical gate means, controlled by at least two of said binary signals, for producing signals indicative of the presence and location of a defect in said system.

3. Apparatus as recited in claim 2 wherein said fire control system has a cant resolver and a pair of driving amplifiers for said resolver, connected to receive said superelevation and deflection signals and to modify them in response to the cant angle of said tank, said means for testing further comprising:
   means for bypassing said cant resolver and said driving amplifiers to said servos;
   summing means for summing the output signals from said driving amplifiers, the output signals of said resolver, and the elevation command signal to said gun elevation servo; and
   comparator means adapted to generate binary signals $\epsilon$, indicative that said driving amplifiers and said resolver have no defects, when the output voltage of said summing means is within a window of voltages, to extinguish $\zeta$ signal when said output voltage is on one side of said window, and to extinguish the $\epsilon$ signal when said output voltage is on the other side of said window.

4. Apparatus as recited in claim 3 and further comprising means for weighting the inputs to said summing means.

5. Apparatus as recited in claim 4 in which said means for weighting comprises resistors having a value $a$ in the signal channel from said amplifiers and the value $b$ in the signal channel from said elevation servo, and wherein $|b| = |2a - 2|$.

6. Apparatus as recited in claim 3 and further comprising:
a first plurality of logic gates connected and adapted to generate a binary signal $(\overline{\alpha \beta} \, \overline{\gamma} + \overline{\alpha \beta} \gamma + \alpha \beta \gamma) \overline{\delta} + \overline{\delta}$ indicative that the computer is not defective, wherein the binary signals are defined:

$\alpha =$ The feedback circuits of the two said circuits are equal
$\beta =$ The forward circuit of the elevation servo is within limits
$\gamma =$ The forward circuit of the deflection servo is within limits
$\delta =$ The range signal delivered to the system is within limits
$\zeta =$ The driving amplifiers for the cant resolver are operating properly.

7. Apparatus as recited in claim 6 and further comprising at least one logic gate, connected and adapted to generate a binary signal, $\alpha + \beta + \overline{\gamma} + \overline{\delta}$, indicative that the output unit mechanism of the super-elevation servo has no defects.

8. Apparatus as recited in claim 6 and further comprising at least one logic gate, connected and adapted to generate a binary signal, $\alpha + \overline{\beta} + \gamma + \overline{\delta}$, indicative that the reticle projector servo has no defects.

9. Apparatus as recited in claim 7 and further comprising at least one logic gate, connected and adapted to generate a binary signal, $\alpha + \overline{\beta} + \gamma + \overline{\delta}$, indicative that the reticle projector servo has no defects.

10. Apparatus as recited in claim 9 and further comprising at least one logic gate, adapted to generate a binary signal indicative of no defects in said system, connected to receive signals indicative that said computer is not defective, that said output unit mechanism has no defects, that said reticle projector servo has no defects, $\delta$, and $\epsilon$, wherein the binary signal $\epsilon$ indicates that said resolver has no defects.

* * * * *